US012745107B2

(12) United States Patent
Taga et al.

(10) Patent No.: US 12,745,107 B2
(45) Date of Patent: Sep. 22, 2026

(54) NETWORK MANAGER AND METHOD FOR A RADIO ACCESS NETWORK OF A BROADCAST NETWORK

(71) Applicant: ROHDE & SCHWARZ GMBH & CO KG, Munich (DE)

(72) Inventors: Aziz Taga, Munich (DE); Lars Oestreicher, Munich (DE); Johannes Sinnhuber, Kaufering (DE); Maurice Uhlmann, St. Wolfgang (DE); Thomas Janner, Grobenzell (DE); Manfred Reitmeier, Landshut (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 354 days.

(21) Appl. No.: 18/558,987

(22) PCT Filed: May 4, 2022

(86) PCT No.: PCT/EP2022/062012

§ 371 (c)(1),
(2) Date: Nov. 3, 2023

(87) PCT Pub. No.: WO2022/233953

PCT Pub. Date: Nov. 10, 2022

(65) Prior Publication Data

US 2024/0381125 A1 Nov. 14, 2024

(30) Foreign Application Priority Data

May 4, 2021 (EP) .................................... 21172115

(51) Int. Cl.

| | |
|---|---|
| ***H04W 24/02*** | (2009.01) |
| ***H04W 28/02*** | (2009.01) |
| ***H04W 64/00*** | (2009.01) |

(52) U.S. Cl.
CPC ....... *H04W 24/02* (2013.01); *H04W 28/0268* (2013.01); *H04W 64/00* (2013.01)

(58) Field of Classification Search
CPC . H04W 24/02; H04W 28/0268; H04W 64/00; H04W 4/06; H04W 72/29
See application file for complete search history.

(56) References Cited

U.S. PATENT DOCUMENTS

2022/0078935 A1* 3/2022 Wu ......................... B32B 7/023
2022/0338229 A1* 10/2022 Sengupta ............. H04W 72/23

FOREIGN PATENT DOCUMENTS

EP 3343808 A1 * 7/2018 ............. H04H 60/91
EP 3633938 A1 4/2020

(Continued)

OTHER PUBLICATIONS

Machine Translation of KR 100876799 B1 (Year: 2008).*

(Continued)

*Primary Examiner* — Khaled M Kassim
*Assistant Examiner* — Noah James Sugden
(74) *Attorney, Agent, or Firm* — Patterson + Sheridan, LLP; Carleton S. Clauss

(57) ABSTRACT

The present disclosure provides a network manager comprising a data interface configured to communicatively couple to at least one radio access network of a broadcast network that is configured to wirelessly emit a load data signal; and a network controller communicatively coupled to the data interface and configured to receive receiving device data, the receiving device data indicating reception parameters of the reception of the load data signal at at least one receiving device, and to provide configuration data to the at least one radio access network based on the received receiving device data, the configuration data indicating at least one optimized radio access network resource for transmission of (Continued)

the load data. Further, the present disclosure provides a respective method.

16 Claims, 4 Drawing Sheets

(56) References Cited

FOREIGN PATENT DOCUMENTS

| | | | | |
|---|---|---|---|---|
| KR | 100876799 B1 * | 1/2009 | ............ H04W 76/40 |
| WO | 2020053889 A1 | 3/2020 | |
| WO | 2020053889 A8 | 6/2021 | |

OTHER PUBLICATIONS

Machine Translation of EP 3343808 A1 (Year: 2017).*

European Patent Office, extended European Search Report for Application 21172115.4-1218 dated Oct. 15, 2021.

PCT, Notification of Transmittal of The International Search Report and The Written Opinion of The International Searching Authority, or The Declaration for Application PCT/EP2022/062012 dated Aug. 31, 2022.

* cited by examiner load data source network
LDSN
broadcast network
core network
CRN
LDSI
RAN
BCN
306
304
305
304
303
307
318
301
309
315
302
power manager
224
network controller
300
network manager

NETWORK MANAGER AND METHOD FOR A RADIO ACCESS NETWORK OF A BROADCAST NETWORK

TECHNICAL FIELD

The disclosure relates to a network manager and a respective method.

BACKGROUND

Although applicable to any combination of different networks, the present disclosure will mainly be described in conjunction with broadcast networks and cellular networks.

Today, the number of communication devices that are served in cellular networks increases steadily. One source of new communication devices is the increasing demand of users for mobile voice and data communication. Other sources of this increase are new applications, like Internet-of-Things or IoT devices.

With an increasing number of communication devices, cellular networks become more and more complex. Consequently, the technical and financial efforts required for building and managing such networks continually increase.

There is a need for reducing these efforts.

SUMMARY

The above stated problem is solved by the features of the independent claims. It is understood, that independent claims of a claim category may be formed in analogy to the dependent claims of another claim category.

Accordingly, it is provided:

A network manager comprising a data interface configured to communicatively couple to at least one radio access network of a broadcast network that is configured to wirelessly emit a load data signal; and a network controller communicatively coupled to the data interface and configured to receive receiving device data, the receiving device data indicating reception parameters of the reception of the load data signal at at least one receiving device, and to provide configuration data to the at least one radio access network based on the received receiving device data, the configuration data indicating at least one optimized radio access network resource for transmission of the load data.

Further, it is provided:

A method for managing a broadcast network, the method comprising receiving device data, the receiving device data indicating reception parameters of a reception of a load data signal at at least one receiving device, the load data signal being emitted by at least one radio access network of the broadcast network; and providing configuration data to the at least one radio access network based on the received receiving device data, the configuration data indicating at least one optimized radio access network resource for transmission of the load data.

The present disclosure acknowledges the fact that serving more devices in cellular networks increases the complexity of the networks, since smaller cells need to be provided, or more capable transmitters need to be provided, to serve the increased number of devices. With increasing capabilities, the complexity and therefore also the costs for the transmitters raise. The same may apply to the power consumption of such transmitters. Operating the cellular network therefore becomes more demanding technically and economically.

When planning a cellular network, the operator of the network may estimate the average load on the cellular network and dimension the cellular network accordingly. However, when a cellular network is dimensioned for an average load, the cellular network may experience congestion and overload situations.

Such situations may for example arise when an important event, like a live sports event is viewed by many users on their mobile devices. The data stream comprising e.g., video and audio data for such a sports event, needs to be provided to all transceivers of the cellular network that currently serve at least one user that wants to view the event. In addition, users today expect a flawless experience, where the video and audio data is distributed with low latencies and high quality, an expectation that is difficult to meet, especially under high-load conditions.

This is especially true, since mobile cellular networks have been based, and still rely on a strong unicast communication model to provide various services to their end users. However, nowadays consumers find their comfort while watching a huge amount of premium content, of which a high percentage is live media services.

On the other hand, broadcast networks are well established for broadcast and multicast data transmission like TV and radio transmissions via digital video broadcast like DVB-T, for terrestrial transmission, or DVB-S, for satellite transmission. Since broadcast networks are usually designed to provide broadcast or multicast one-way data transmission, these networks may operate efficiently with any number of receiving devices. Further, since the area of coverage of a transmitter of a broadcast network is larger than the area of coverage of a transmitter of a cellular network, which is especially the case for satellite-based broadcast networks, the network infrastructure of broadcast networks is less complex to build and maintain than the infrastructure of cellular networks.

The present disclosure acknowledges that users will demand more and more services from cellular networks on their mobile devices that either require overprovisioning or may lead to congestion in the cellular networks. The present disclosure, therefore, provides means for effectively using the infrastructure provided by broadcast networks to provide data to devices that usually operate in cellular networks.

A cellular network in the context of the present disclosure may be a communication network providing bi-directional wireless communication for electronic devices, like user equipment such as mobile phones, also called UE, IoT devices and the like. Usually, a cellular network is a distributed network comprising "cells", wherein each cell is served by at least one fixed-location transceiver. A site hosting the fixed-location transceivers may also be called a base station. A cellular network usually allows transmission of voice, video and audio data and other types of content. Neighboring cells usually use different sets of frequencies to avoid interference between the single cells. Mobile devices in the cellular network may perform a hand-over when moving from one cell to another. All cells together form the cellular network and provide radio coverage over a wide geographical area, wherein small local cells, e.g. indoor cells, are also possible. A cellular network in the context of the present disclosure may also comprise a satellite-based cellular network. Such a satellite-based cellular network may offer bidirectional communication to receiving devices in small cells with low flying satellites. Usually, such a satellite-based cellular network will comprise a large number of satellites. These types of satellite-based cellular network may be designed for unicast data communication. The single transceivers of a cellular network are usually communicatively coupled to a common network, also called core network or backbone network. Data may be served to the transceivers from the common network and may be provided from the transceivers into the common network. It is understood, that the common network not necessarily is a single network, but may also comprise different network segments that may be communicatively coupled to each other via other networks, like e.g. the internet or dedicated backbone networks.

In cellular networks traditionally, a point-to-point communication is performed, like e.g. when a telephone call is conducted between to devices. In modern cellular networks like e.g., 5G networks, multicast transmissions are also possible. Due to the limited size of the single cells in a cellular network, the data to be transmitted in a multicast mode hast to be transmitted to every single transceiver via the common network.

In the context of the present disclosure, the operator of a cellular network may also be called the MNO or mobile network operator.

A broadcast network in the context of the present disclosure may be a one-way communication network that usually provides at least one of audio communication and/or video communication in a one-way or unidirectional fashion to electronic devices, like radio receivers or TV sets. It is understood, that a broadcast in the context of the present disclosure may be terrestrial broadcast network, a satellite broadcast network or a combination of both.

It is understood, that in the context of the present disclosure, a broadcast network may also provide communication to devices that are usually served by cellular networks. Further, in the context of the present disclosure a broadcast network is not limited to broadcast transmissions, but may also provide multicast transmissions. A broadcast transmission in this context is to be understood as a transmission to all receivers within reach of a single transmitter. A multicast transmission in this context is to be understood as a transmission to a limited group of receivers within reach of a single transmitter, instead of all receivers.

A broadcast network may be formed by a group comprising of at least one of a plurality of radio stations, a plurality television stations, or combined radio and television stations, or satellite stations. The term radio station refers to equipment for transmitting audio content wirelessly e.g., over the air. The term television station refers to equipment for transmitting audio and video content wirelessly e.g., over the air. The term satellite station refers generally to a satellite that is communicatively linked to a ground station and may be used as a radio access network or transmitter in the broadcast network.

It is understood, that for a broadcast network a common network, also called core network, may be provided that couples to the single transmitters, as explained above for cellular networks. If one or more satellites are part of the broadcast network, the respective ground stations may be communicatively coupled to the core network of the broadcast network. Since the area of coverage of a transmitter of a broadcast network is larger than the area of coverage of a transmitter of a cellular network, the common network needs to connect to a smaller number of transmitters and therefore usually is of lower complexity than the common network of a cellular network.

As explained above, the geographical area covered by each of the transmitters of a broadcast network is larger than the geographical area covered by each of the transmitters of a cellular network. In embodiments, the geographical area covered by each of the transmitters of a broadcast network may comprise an area larger than the geographical area covered by at least two transmitters of a cellular network, i.e. larger than two cells of the cellular network.

In examples, the area covered by a single terrestrial transmitter of a broadcast network may comprise a radius of about 1 km up to more than 100 km. The area covered by a single transmitter of a cellular network may comprise a radius of up to 35 km. At the same time, the transmitting power of a transmitter in a broadcast network may range up to 20 KW. In cellular networks, the transmitting power of the respective transmitters may range up to 500 Watts. Further, the transmitters in broadcast networks will usually use other frequencies than the transmitters in cellular networks. The transmitters in the broadcast networks may for example use frequencies in the UHF band, for example between 470 MHz and 698 Mhz.

For satellites as transmitters, the size of the area of coverage may be size of the full earth globe, and the transmission power may be between 20 W and 300 W (depending on the bands and the usage).

Exemplary standards used in broadcast networks may comprise DVB-based protocols, especially DVB-T and DVB-S based protocols, ATSC-based protocols, and 5G for broadcast networks or any future broadcast network standard. In cellular networks, the respective standards like UMTS, LTE and 5G or any future cellular network protocol may be used.

In the context of the present disclosure, the operator of a broadcast network may also be called the BNO or broadcast network operator.

The cellular networks and the broadcast networks mentioned in the present disclosure may comprise so called radio access networks or RANs and core networks or CNs. A RAN or Radio Access Network provides a radio access technology, and usually resides between a user device and the respective CN. A RAN in the context of the present disclosure may comprise the base station with respective antennas and a connection to the CN, and/or a satellite with connection to the CN via a respective ground station.

The radio access networks, also called RANs, and core networks, also called CNs, mentioned in the present disclosure are not limited to a specific type of network. Nevertheless, in the present disclosure a RAN with regard to cellular networks may comprise at least one of a GRAN, also GSM radio access network, a GERAN, which is essentially the same as GRAN but specifying the inclusion of EDGE packet radio services, a UTRAN, also called UMTS radio access network, and an E-UTRAN, the Long Term Evolution (LTE) high speed and low latency radio access network, or a RAN according to any upcoming RAN standard, or satellite-based RAN.

Accordingly, in the present disclosure a RAN with regard to a broadcast network may comprise any technology that allows transmitting data in a broadcast or multicast manner to electronic devices. Such a RAN may for example comprise a DVB-T transmitter with respective antennas and a connection to the respective core network, or a satellite as DVB-S transmitter with respective antennas and a connection to the respective core network via the ground station of the satellite.

Possible RANs comprise, but are not limited to, multi-frequency network or MFN RANs, single frequency network or SFN RANs, and SC-PTM RANs, also called Single-Cell-Point-to-Multipoint RANs. The RANs in the context of the present disclosure may for example comprise so called LPLT transmitters, also called low-power low-tower transmitters, HPHT transmitters, also called high-power high-tower transmitters, MPMT transmitters, which are a hybrid transmitter combining elements of LPLT and HPHT transmitters. MPMT stands for Medium Power Medium Tower. MPMT transmitters may have an output power that comes in between LPLT and HPHT, e.g. 350 W-6 KW, which automatically results in a coverage capability between those of LPLT and HPHT, e.g. 5 KM-30 KM, depending on the specific deployment scenarios and other parameters. Further, a RAN in the context of the present disclosure may comprise at least one transmitter with a fixed geographical location. As explained above, a transmitter for a broadcast network may comprise a transmitting power of up to 20 KW or more, and cover an area of more than 100 km radius.

The term core network in the context of the present disclosure refers to a network that couples to the RANs of the respective network. Core networks are sometimes also referred to as backbone networks. It is understood, that any networking technology, like cable-based ethernet, optical fiber-based ethernet, or other network technologies may be used to transmit data in the core network to and from the RANs. The core network may further comprise connections to other networks, like the networks of content providers or the like.

It is understood, that radio access networks and core networks in the context of the present disclosure may comprise further elements, like network connections, network switches, network hubs, servers, and the like.

The present disclosure acknowledges, as indicated above, that data may be offloaded from load data source networks, like cellular networks, to a broadcast network. To support offloading of load data to the broadcast network, the present disclosure provides the network manager.

The network manager comprises a data interface that communicatively couples a network controller to at least one radio access network of the broadcast network. The data interface may also couple the network manager to other networks, like for example to a load data source network. Such a load data source network may be the core network of the broadcast network. The core network usually transports load data to the radio access networks for emission in a load data signal to the receiving devices.

It is understood, that the load data source network and the radio access networks may be operated by the same operator. The network controller may therefore be coupled via a single network to the load data source network and the radio access networks. Communicatively coupled in this context refers to the data interface being capable of communicating with the respective entity, while a direct network connection or indirect network connection e.g., via other networks like the internet, is possible. Further, the data interface may comprise a single hardware interface or multiple hardware interfaces.

In other examples, the load data source network and the radio access networks may be operated by different operators and may not be provided in the same network. The data interface in such an example may communicatively couple to the different operators' networks as required directly or indirectly via a single or multiple hardware interfaces.

The network manager of the present disclosure may be provided in the broadcast network. In such an embodiment the data interface may be an internal interface in the broadcast network. The network manager may for example be provided as dedicated element, like a server in the broadcast network. Such a server may be communicatively coupled to the radio access networks, and possibly a core network of the broadcast network via a hardware-based data interface, like an Ethernet interface. It is understood, that the network manager may also be communicatively coupled to the radio access networks indirectly via the core network of the broadcast network. The network manager may also be provided as an additional function in a server that is already present in the core network. Such a network manager may for example be provided as software application in the server or a function of a firmware or operating software of the server. Such a network manager may comprise the data interface as a software-based interface, like an API, or as a combination of a software-based and a hardware-based interface.

The core network is usually communicatively coupled to at least one radio access network. It is understood, that the broadcast network may comprise any number of radio access networks that may all be coupled, directly or indirectly, to the core network. The single radio access networks may be distributed over a specific geographical area like e.g., a country or simply the area of operation of a network operator that operates the broadcast network. The core network distributes load data to the radio access networks that is to be distributed or emitted via the radio access networks. It is understood, that the core network may comprise routing mechanisms that allow transmitting specific pieces of load data only to those radio access networks that should emit the load data in respective load data signals. It is understood, that the load data refers to the content or content data that is to be transmitted to receiving devices. Such load data may comprise video data, audio data, software update data, or any other type of data that is to be transmitted.

It is understood, that the core network may comprise a respective interface or respective interfaces that allow operators of cellular networks or other content providers to provide the load data to the core network. Such interfaces may comprise hardware-based network interfaces, API-based or software-based interfaces, or a combination of both. The core network may for example be coupled via a hardware interface to a network of a content provider or cellular network operator directly or indirectly. The load data may be provided to the core network via an upload functionality that is provided by the core network. It is understood, that such an upload functionality may comprise security measures, like e.g. authentication and encryption. In embodiments, the core network may for example comprise one or more FTP or HTTP(S) servers, that allow a content provider to upload the load data. In case of live streaming data, the core network may also provide a streaming endpoint, that accepts the load data in the form of a stream for further processing in the core network. In other embodiments, the broadcast network e.g., the network controller mentioned below or other elements of the core network, like a data loader, may be configured to retrieve the load data from a location that may be indicated by the provider of the load data.

The network manager comprises a network controller that controls how the load data is transmitted to the receiving devices by the radio access networks, by providing respective configuration data to the radio access networks. The configuration data indicates which radio access network resources the radio access networks should use for emission of the load data signal.

To this end, the network controller receives receiving device data. The receiving device data may be data about the types of receiving devices and/or data provided by the receiving devices. Both types of data serve for determining radio access network resources that should be used by the radio access networks to emit the load data signal such that the load data signal is received in the receiving devices with the best receiving quality possible. It is understood, that the receiving device data may be provided to the network controller via the data interface. To this end, the data interface may also communicatively couple to the source of the receiving device data. This source may be e.g., a cellular network that hosts the receiving devices, or a content provider network that serves the load data for transmission to the receiving devices to the radio access networks.

For example, a content provider of the load data may provide receiving device data indicating that only mobile devices may be receiving the load data. The content provider may for example decide to serve stationary devices via line or cable based network connections, and to only serve the mobile devices via the broadcast network.

In another example, the receiving devices—fixed or mobile—may provide a feedback about the receiving quality of the load data signals to the network controller, for example indirectly via a respective content provider network.

The network controller may then determine radio access network resources that may improve the reception of the emitted load data signals at the receiving devices.

For transmission of the load data, the network controller provides the configuration data to the relevant radio access networks that configures the respective radio access networks to use the radio access network resources as indicated.

If the load data should only be distributed in specific areas, the network controller may also identify the relevant radio access networks and provide the configuration data to the respective radio access networks only. The information about the specific areas may be provided in the receiving device data. Alternatively, location information may be provided in the receiving device data, and the network controller may define the specific areas based on the location information.

The core network of the broadcast network may also provide the load data to the respective radio access networks only, after being informed by the network controller accordingly. In order to provide the configuration data, the network controller may convert the respective information into respective configuration data, that is understood by the radio access networks.

It is understood, that the network controller may provide the configuration data to the radio access networks prior to the core network providing the load data to the respective radio access networks. To this end, the configuration data may identify the load data with a respective identifier that may be provided in the configuration data and the load data. This allows for example pre-configuring the radio access networks when the request for transmission of the load data is received, which may be long before the load data is to be emitted, and therefore long before the load data is provided to the core network. This may for example be the case, when a cellular network operator reserves radio access network resources for the transmission of a live event, like a sports event or a live concert, long before the event is happening.

The radio access networks may comprise respective controllers that receive and store the configuration data and control the transmitter elements in the radio access networks accordingly. In modern network architectures, single elements may be virtualized. Therefore, the controllers of the radio access networks may also be provided as virtualized controllers in a server that is provided in the core network of the broadcast network. Respective configuration data may then be provided from the virtualized controllers to the other elements of the radio access networks. It is understood, with the possibility of virtualizing network elements, that an element that is disclosed in the present disclosure as being part of or being comprised by another element, may be functionally linked to the other element. At the same time such an element may be virtualized and provided at another location but linked via respective data connections to the other element.

It is understood, that the configuration data and the load data may be provided to the radio access networks as separate information, especially if the configuration data is provided before the load data. However, in cases where the configuration data is provided at the same time as the load data, the configuration data and the load data may be provided to the radio access networks as combined data. The network controller may for example receive the load data via the data interface and provide the configuration data as a header to the load data. Alternatively, the network controller could provide the configuration data to the load data source network, which could add the configuration data as header data to the load data. This also allows dynamically changing the configuration data for different segments of the load data that comprise a dedicated header.

A broadcast network in the context of the present disclosure is capable of dynamically receiving the load data from e.g., a cellular network, and of transmitting the load data to electronic devices, that usually receive the load data via the cellular network. Instead of by a cellular network, the load data may also be provided directly by a content distribution network or other content providers.

By accepting the receiving device data, the network controller may adapt the transmission of the load data via the broadcast network to the receiving devices to improve the reception of the load data at the receiving devices.

Especially for cellular networks, the network manager allows using a broadcast network as a kind of backup network or offloading network for high load situations. Further, via the network controller, an operator of such a network, like a cellular network, may dynamically offload load data into the broadcast network. It is understood, that the respective receiving devices may be informed via the respective network e.g., the cellular network, about the transmission of the load data via the broadcast network.

Further embodiments of the present disclosure are subject of the further dependent claims and of the following description, referring to the drawings.

In an embodiment, the receiving device data may comprise at least one of a type indication for at least one receiving device, a mobility information for at least one receiving device, a position information for at least one receiving device, a quality of service information for at least one receiving device, a quality of experience information for at least one receiving device, a viewing rate for at least one receiving device, a reception information regarding the reception of predefined data transmitted via the at least one radio access network to at least one receiving device, a handover information provided to at least one receiving device regarding a handover of the at least one receiving device between two radio access networks, a signal strength indication for at least two of the radio access networks as measured by at least one receiving device, a frequency range or bandwidth for transmission of the load data, and a modulation scheme for transmission of the load data.

The receiving device data may refer to a plurality of different details about the receiving devices or about the signal reception in the receiving devices.

Possible receiving device data may refer to a type indication for at least one receiving device. The type indication may inform the broadcast network about the types of receiving devices. Such receiving devices may for example comprise smartphones, tablet PCs, notebooks, IoT devices, vehicles, and the like.

Usually, the quality of signal reception may be different in different types of devices. For example, a tablet PC or notebook may comprise larger or more antennas than a smartphone, or a vehicle may comprise optimized antennas on the roof. The network controller may, consequently, adapt the radio access network resources according to the types of receiving devices.

A further possible receiving device data comprises a mobility information for at least one receiving device. The mobility information may indicate, if the respective receiving device is mobile or at a fixed position. The network controller may accordingly adapt those radio access network resources, that influence the reception of the load data signal when a device is fixed or mobile. Such a radio access network resource may for example comprise the cyclic prefix of the load data signal. For mainly mobile devices, the cyclic prefix may be set e.g., to 120 ms. The frequency range used for transmission of the load data signals may for example be set to 10 MHz for fixed devices, and to 20 MHz for mobile devices, or to 15 MHz for a mix of mobile and fixed devices. Usually, the bandwidth may be 5, 10, 15 and 20 MHz. The cyclic prefix may for example be 33 μs, 66 μs, 100 μs, 200 μs and 300 μs Another possible receiving device data may comprise a position information for at least one receiving device. The position information may be determined for example by an operator of a cellular network that serves the receiving device, e.g. by triangulation. The operator may also query the receiving devices that may comprise a GPS or other location determination system. As alternative, the position information may be provided by the receiving devices directly e.g., via a respective application or firmware function in the receiving devices.

The knowledge about the position of the receiving devices allows the network controller to e.g., select specific radio access networks for transmission of the load data signal. The radio access networks may for example serve the same geographical area, but for specific locations a specific radio access network may have better coverage than others.

A further possible receiving device data may comprise at least one of a quality of service, QoS, information and a quality of experience, QoE, information for at least one receiving device. The receiving devices may provide a QoS or QoE information to the network controller, directly or indirectly via e.g., a cellular network or another network like the internet. The QoS or QoE information may refer to the signal reception of the load data signal at the receiving device e.g., a RSSI. The QoS or QoE information may also refer to the quality of the load data. The quality of the load data may e.g. indicate that a video may be displayed without lag or artefacts or that artefacts are present in the video because signal reception is not god enough. The network controller may adapt the radio access network resources to improve the QoS at the receiving devices accordingly. Based on reported parameters from a receiving device, the network controller may change for example the MCS (Modulation and Coding Scheme) from a higher to a lower modulation to make the reception more robust.

Another possible receiving device data may comprise a viewing rate for at least one receiving device. The uplink will be used in order report the RAN conditions. As indicated above and below the receiving device data may comprise a lot of different information that can be sent from at least a single receiving device to the broadcast network in order to decide on how to transmit to load data. For example, if a cellular radio access network is congested, the easiest fix would be to change the transmission type from one-to-one to one-to-many. For example, the reception capabilities/parameters may provide a basis to make the right decision. Other parameters may comprise the RSRP (Reference Signal Received Power), RSRQ (Reference Singla Received Quality) and SNR (Signal to Noise Ratio). The viewing rate as receiving device data may replace such parameters, since content providers using the broadcast distribution may not have access to such information.

Another possible receiving device data may comprise a reception information regarding the reception of predefined data transmitted via the at least one radio access network to at least one receiving device. The predefined data may be any data that may be provided in the load data signal to verify the reception of this data. Such data may also be called test or verification data. The predefined data may be transmitted only once or repeatedly. The information about the reception of this data may be provided by the receiving devices to the network controller, directly or indirectly. The network controller may adapt the radio access network resources to improve the QoS at the receiving devices accordingly.

Another possible receiving device data may comprise a handover information provided to at least one receiving device regarding a handover of the at least one receiving device between two radio access networks. The handover information may be provided in the load data signal to the receiving devices and inform the receiving devices about the details of transmission of the load data signal in neighboring geographical regions to the current position of the receiving devices. The receiving devices may provide this information back to the network controller, especially in a filtered version. The filtered version may comprise only the information that is relevant for the respective receiving device, for example because the receiving device is already receiving signals from such a neighboring geographical region. The network controller may adapt the radio access network resources to improve the QoS at the receiving devices accordingly. The network controller may also adapt the radio access network resources for the radio access networks in the neighboring geographical region. Based on reported parameters from a receiving device, the network controller may change for example the MCS (Modulation and Coding Scheme) from a higher to a lower modulation to make the reception more robust.

A further possible receiving device data may comprise a signal strength indication for at least two of the radio access networks as measured by at least one receiving device. A receiving device may receive data from two or more radio access networks that serve an at least partially overlapping geographical region. Information about such a multiple reception may be provided back to the network controller by the receiving devices, directly or indirectly. The network controller may adapt the radio access network resources to improve the QoS at the receiving devices accordingly. The network controller may for example decide to stop the transmission of the load data via a specific one of the radio access networks, if all receiving devices may be served by a single radio access network.

Another possible receiving device data may comprise at least one of a frequency range or bandwidth for transmission of the load data, and a modulation scheme for transmission of the load data, Other possible radio access network resources may refer to Cyclic Prefix, CP, Sub-Carrier Spacing, SCS, Allocation Retention Priority, ARP, Pre-emption Capability Indicator, PCI, Pre-emption Vulnerability Indicator, PVI, Channel Quality Indicator, CQI (within radio access network), and Quality of service Class Indicator, QCI (within core network).

In another embodiment, the receiving device data may comprise a ratio of fixed-position receiving devices and mobile receiving devices. The network controller may be configured to determine the configuration data based on the ratio of fixed-position receiving devices and mobile receiving devices.

The network controller may not only optimize the transmission of the load data signal for a single group of fixed or mobile receiving devices. Instead, the network controller may determine radio access network resources that optimize the reception of the load data signal for all receiving devices as much as possible.

In a further embodiment, the at least one radio access network resource may comprises at least one of a geographical location for transmission of the load data, a frequency range or bandwidth for transmission of the load data, a transmission time or time slot for transmission of the load data, a modulation scheme for transmission of the load data, and an assignment of load data to multicast channels.

At least some of the radio access network resources that the network controller may adapt or define refer to the emission of the load data signal and may define the frequencies or frequency ranges or bandwidth used to transmit the load data signals. The network controller may for example change the frequencies or frequency bands used for the transmission of the load data to frequencies or frequency bands, which in a specific area are known to be free of interference.

The modulation scheme used for the transmission of the load data signal may also be adapted according to the capabilities and/or the reception quality of the load data signals in the receiving devices. Some receiving devices may for example not be capable of using specific modulation schemes, or the signal quality may be too low for some modulation schemes, to correctly demodulate the load data signal. The network controller may then adapt the radio access network resources, such that other modulation schemes are used.

Other radio access network resources regarding the modulation scheme may refer to a Cyclic Prefix, CP: Sub-Carrier Spacing, SCS, Allocation Retention Priority, ARP, Pre-emption Capability Indicator, PCI, Pre-emption Vulnerability Indicator, PVI, Channel Quality Indicator, CQI (within radio access network), and Quality of service Class Indicator, QCI (within core network).

In an example, there may be a video call. The network manager may configure the of radio access network resources for creating two bearers, one for audio and one for video with different ARPs. The one with audio may have an ARP of 10 and the one with the video may have an ARP of 12. Whenever the radio access network resources are used up or the signal path is too noisy and there is no other way but to only transmit one service at a time, the network manager may for example drop the video bearer as it has a lower ARP (a higher number) and keep the audio as it is more important than video.

Another possible radio access network resource refers to an assignment of load data to multicast channels. The broadcast network may comprise a multicast control entity that may assign single sessions to different multicast channels. In other embodiments, the network controller may perform this functionality. The term "session" in this regard refers to a related or connected set of load data like e.g., an audio stream, a video stream, or a general data stream. It is understood, that a single multicast channel may comprise or transmit data of multiple sessions and refer to one or more RF carriers.

The setup of the RF carrier(s) may be determined by the number of required multicast channels, and for each multicast channel the modulation and coding scheme, MCS and subframe allocation may be determined accordingly. The network controller or the dedicated multicast control entity may determine the best setup for these parameters depending on the characteristics of the sessions (Quality of Service, Quality Class Identifier, Priority and Preemption, and the like). Further in one or more multicast channels additional sessions may be reserved in addition to the sessions of the broadcast network operator. This allows to manage and split the RF carriers' data rate, and provide the broadcast network operator's own services as well as reserving any remaining data rate to 3rd party services.

In yet another embodiment, the network manager may comprise a power manager, and at least one of the radio access network resources may refer to a transmission power of the at least one radio access network. The power manager may be configured to provide configuration data to the at least one radio access network indicating an adapted transmission power, wherein the power manager may be configured to adapt the transmission power based on usage data for the radio access network resources. The usage data may for example comprises at least one of the receiving device data and a usage schedule for the radio access network resources.

The power manager, instead of being provided in the network manager, may be provided as a dedicated device for example in the core network or in the radio access networks of the broadcast network, or the function of the power manager may be performed by the network controller. The possibility to dynamically adapt the transmission power in the single radio access networks allows minimizing the overall power consumption in the broadcast network.

Adapting the transmission power may comprise switching single transmitters off or on or putting at least some elements of a transmitter into an idle mode, like for example amplifiers, a base band or both. Adapting the transmission power may also comprise adjusting or setting the amplification power of a respective transmitter, especially from a first level e.g., a low level, to a second level e.g., a high level.

It is understood, that the power manager may set the respective radio access network resources for at least one of different time ranges or time slots, frequencies or frequency ranges, or geographical regions.

The power manager may for example determine the transmission power for the single radio access networks based on the number of receiving devices in the geographical region served by the respective radio access networks.

The power manager may also determine the transmission power for the single radio access networks based on a usage schedule for the radio access network resources. The usage schedule may indicate which radio access network resources, like frequencies, geographical regions, and the like are used for specific load data transmissions and at what times. The power manager may derive from the data in the usage schedule about the upcoming usage gaps, like a possible gap of 2 hours during the night between 3 and 5 a.m.

The power manager or the network controller may also be configured to defragment different channels, like the above-presented multicast channels, to reduce the energy consumption.

Defragmenting in this context refers to combining the transmissions of at least two channels into a single channel to maximize the utilization of said channel. This allows turning off, completely or at least for certain time slots, the transmitters of the other channels.

In another embodiment, the data interface may be configured to communicatively couple to a network operator network that is in wireless communication with the at least one receiving device or a content provider network that is in communication with the at least one receiving device, wherein the receiving device data is received from the network operator network or from the content provider network.

The originator of the load data and the request to transmit the load data to receiving devices via the broadcast network may be the operator of a cellular network that is in wireless communication with the receiving devices. The originator may, however, also be an operator of a content provider network. Such a content provider network may be in communication with the cellular network and usually provide the load data to the receiving devices via the cellular network.

It is possible, that the receiving device data is received via the communication interface directly from the originator of the load data i.e., the operator of the cellular network or the operator of a content provider network. The receiving device data may however also be received via another network. If for example, an operator of a content provider network requested the transmission of the load data, the receiving device data may be provided to the broadcast network by the operator of the cellular network that serves the wireless devices.

The opposite is also possible. For example, an operator of a cellular network may request the offloading of the load data to the broadcast network, but the receiving device data may be present in the content provider network. This may be the case, e.g., if the receiving device data is provided to the operator of the content provider network via a respective application installed on the receiving devices. In such cases, the receiving device data is forwarded from the operator of a content provider network to the cellular network and from there it is provided to the broadcast network.

In a further embodiment, the network controller may be configured to verify at least one of the authenticity and the validity of the received receiving device data.

The network controller may verify the authenticity and validity of the receiving device data, such that tampering with or malicious modification of the radio access network resources is prevented.

The authenticity and validity of the device data may be verified by message integrity codes or digital signatures or the like that may be provided with the receiving device data. It is understood, that every receiving device may implement such measures. However, since usually the provider of the load data, like a cellular or wireless network operator, will be trusted, the provider of the load data may also implement these measures centrally and apply them to the receiving device data prior to providing them to the broadcast network.

In another embodiment, the network controller may be configured to verify at least one of the plausibility and the consistency of the received receiving device data.

Even if according to the above, the authenticity and/or validity of the load data is verified, the load data may still be wrong. This may for example happen, if a receiving device is misconfigured or defective.

The network controller may therefore perform a plausibility and/or consistency check, prior to including received receiving device data in the determination of amended radio access network resources.

The network controller may for example take into account how many devices reported bad values and compare it with predefined thresholds. The network controller may then decide where the radio access network resources should be influenced accordingly or not. An artificial intelligence algorithm may perform this task in the network manager.

In an embodiment, the network manager may comprising a control interface communicatively coupled to the network controller that is accessible via a data network, especially at least one of a web-based user-accessible interface, and an API-based machine-accessible interface, and a RESTful interface, and an XML-based or JSON-based interface, and a client-program-based interface.

The control interface may be used to provide the receiving device data to the network manager. Also, requests for offloading load data into the broadcast network may be provided via the control interface to the network manager.

The control interface may be provided as an interface that is easily accessible for human users. To this end, the control interface may for example be provided as a web-based user interface. Such a web-based user interface may be hosted on a server in the broadcast network and may deliver a respective interactive web page to a client program, like a web browser program.

Such an interactive web page may not only allow a user to provide the request for offloading respective load data and the receiving device data. Such an interactive web page may also provide feedback to the user regarding his requests. Regional settings or parameters may for example be shown on a map. Frequency-related settings may for example be shown in a respective diagram, and the like.

In addition or as alternative to the human accessible control interface, a machine-accessible or API-based control interface may be provided. Such a control interface may allow interaction via a respective data format, like XML, JSON, or the like. It is understood, that a single endpoint may be defined for the API-based control interface or that different end-points may be defined, like in a RESTful interface.

It is understood, that a respective client program may also be provided that allows interaction via the control interface. Such a client program may use the machine-accessible version of the control interface and process the data for presentation to the user.

When a request for offloading load data is provided, the control interface may provide a feedback about the availability of the radio access network resources that are requested or that would result in the processing of the receiving device data. If the requested radio access network resources are available, the control interface may report accordingly. In other examples, the control interface may indicate that the requested radio access network resources are not available. In addition, the control interface may provide an alternative or similar set or ranges of radio access network resources that may be used instead. Alternative or similar sets of radio access network resources may be identified by searching for sets of radio resources that only deviate from the request in one, two or three of the radio access network resources. The suggested set of radio access network resources may for example differ from the requested radio access network resources in the geographical region for emission of the load data, in the frequency range or bandwidth used for emitting the load data, in the time or time period used for emitting the load data.

Under normal circumstances the quota relation for transmitting the load data via the broadcast network may be 1:1. This means that the load data is accounted for with a 1:1 relation when assessing the amount of transmitted load data, which may be billed by the operator of the broadcast network to the provider of the load data.

It is understood, that with the suggested set of radio access network resources another quota relation or price may also be provided. If for example, with the originally requested radio access network resources, the quota relation would have been 1:1, the suggested set of radio access network resources may comprise a data-wise more expensive quota relation, like 1:1.5 or 1:2 or a data-wise less expensive quota relation, like 1:0.5. This means that the actually transmitted load data is accounted for with a factor of 1.5 or 2 or 0.5, when assessing the amount of transmitted load data.

It is understood, that the power manager may also be provided as a separate entity and not as part of the network manager.

In such an embodiment, the power manager may comprise data connections to the network manager, the core network and/or the radio access networks for communicating with the network manager, the core network and the radio access network resources accordingly.

The present disclosure therefore explicitly is meant to disclose the power manager as separate element that is not part of a broadcast network but that is communicatively coupled to a broadcast network.

Further, the present disclosure is also meant to expressly disclose a broadcast network comprising the network manager. Such a broadcast network may comprise at least one radio access network and a network manager. Of course, such a broadcast network may also comprise a core network as load data source network.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
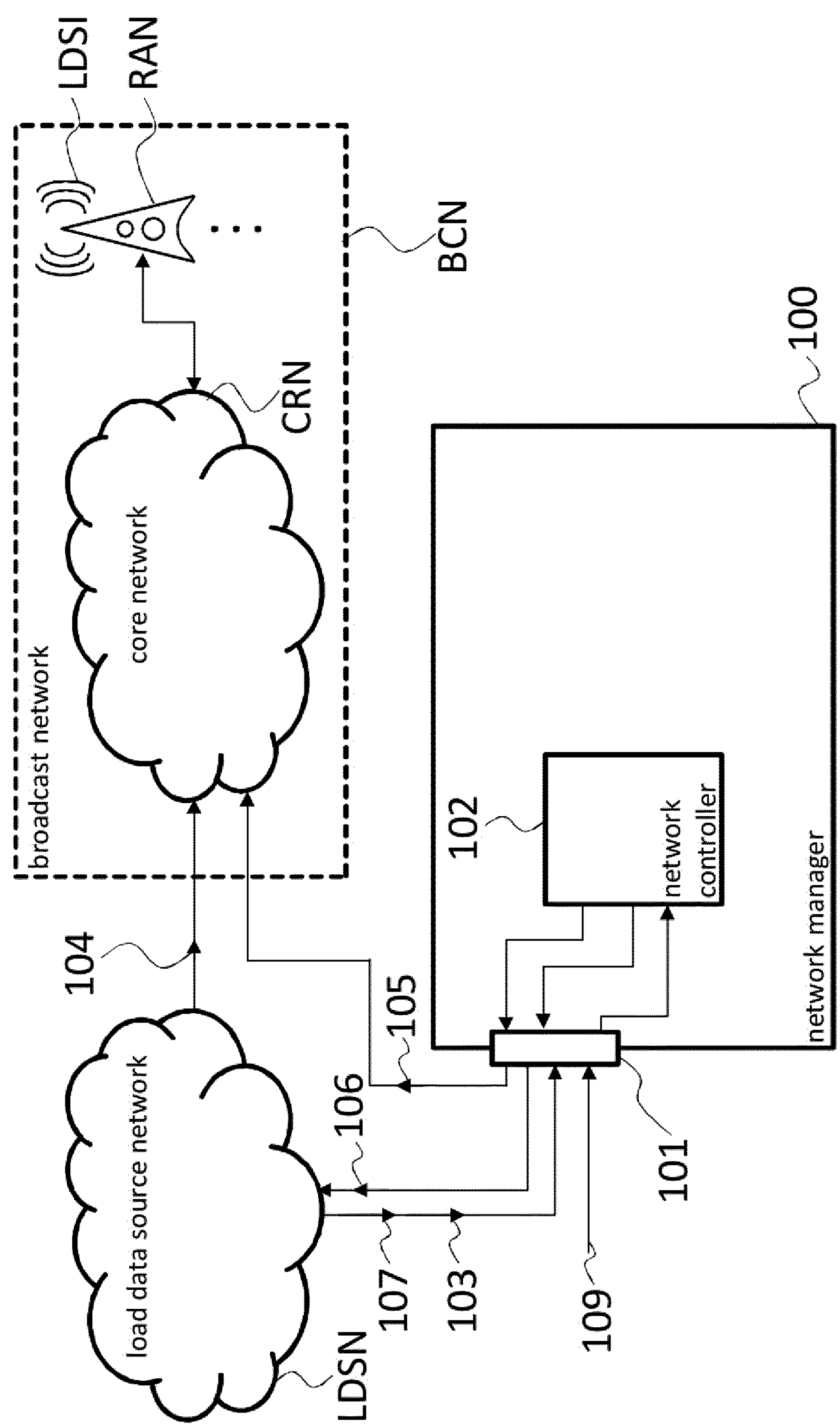
FIG. 1 shows a schematic diagram of an embodiment of a network manager according to the present disclosure, a load data source network and a broadcast network.

FIG. 1 shows a schematic diagram of a network manager 100 together with a load data source network LDSN and a broadcast network BCN.

The load data source network LDSN may be the network of a load data provider, like for example a streaming media service. It is understood, that the load data source network LDSN may comprise data storages, network devices and any other element required to provide the respective services offered by the load data source network LDSN.

The broadcast network BCN comprises a core network CRN that is communicatively coupled to a plurality of radio access networks RAN that emit wireless load data signals LDSI. For sake of clarity, only one radio access network RAN is shown, and more radio access networks RAN are hinted at by three dots. It is understood, that the broadcast network BCN may comprise any number of radio access networks RAN distributed over the area of operation of the operator of the broadcast network BCN. The core network CRN provides load data 104 to the radio access networks RAN for transmission to receiving devices in the load data signals LDSI. The load data 104 may be provided from the load data source network LDSN to the core network CRN directly.

In embodiments, the load data source network LDSN may be implemented as the core network CRN. In such embodiments, the load data 104 may be provided from any other source to the core network CRN. Further, it is understood, that the above-presented explanations regarding load data source networks and broadcast networks may be applied to the load data source network LDSN and the broadcast network BCN.

In addition, in other embodiments, the network manager 100 may be provided as component of the load data source network LDSN or as component of the broadcast network BCN, especially of the core network CRN.

The network manager 100 comprises a data interface 101 that is internally communicatively coupled to a network controller 102. Externally, the data interface 101 may be communicatively coupled to the load data source network LDSN and to the broadcast network BCN.

The network controller 102 receives receiving device data 109 via the data interface 101, and provides configuration data 105 to the at least one radio access network RAN based on the received receiving device data 109. The receiving device data 109 may also be provided via the load data receiving network or the broadcast network.

The receiving device data 109 indicates reception parameters of the reception of the load data signal LDSI at at least one receiving device. The configuration data 105 indicates at least one optimized radio access network resource for transmission of the load data 104 that may be configured in the at least one radio access network RAN e.g., by the core network CRN.

The receiving device data 109 may for example comprise a type indication for at least one receiving device, a mobility information for at least one receiving device, a position information for at least one receiving device, a quality of service information for at least one receiving device, a quality of experience information for at least one receiving device, a viewing rate for at least one receiving device, a reception information regarding the reception of predefined data transmitted via the at least one radio access network RAN to at least one receiving device, a handover information provided to at least one receiving device regarding a handover of the at least one receiving device between two radio access networks RAN, a signal strength indication for at least two of the radio access networks RAN as measured by at least one receiving device, a frequency range or bandwidth for transmission of the load data 104, and a modulation scheme for transmission of the load data 104.

The receiving device data 109 may also comprises a ratio of fixed-position receiving devices and mobile receiving devices. In this case, the network controller 102 may determine the configuration data 105 based on the ratio of fixed-position receiving devices and mobile receiving devices.

The radio access network resource may comprise a geographical location for transmission of the load data 104, a frequency range or bandwidth for transmission of the load data 104, a transmission time or time slot for transmission of the load data 104, a modulation scheme for transmission of the load data 104, an assignment of load data 104 to multicast channels.

The network controller 102 may also verify at least one of the authenticity and the validity of the received receiving device data 109 prior to providing the configuration data 105. Further, the network controller 102 may verify at least one of the plausibility and the consistency of the received receiving device data 109 prior to providing the configuration data 105.

The data interface 101 may for example communicatively couple to a network operator network that is in wireless communication with the at least one receiving device and receive the receiving device data 109 via this network. In addition or as alternative, the data interface 101 may couple to a content provider network that is in communication with the at least one receiving device and receive the receiving device data 109 via this network. The content provider network may for example be the load data source network LDSN and the network operator network may be a cellular network that serves the receiving devices.

Figure 2:
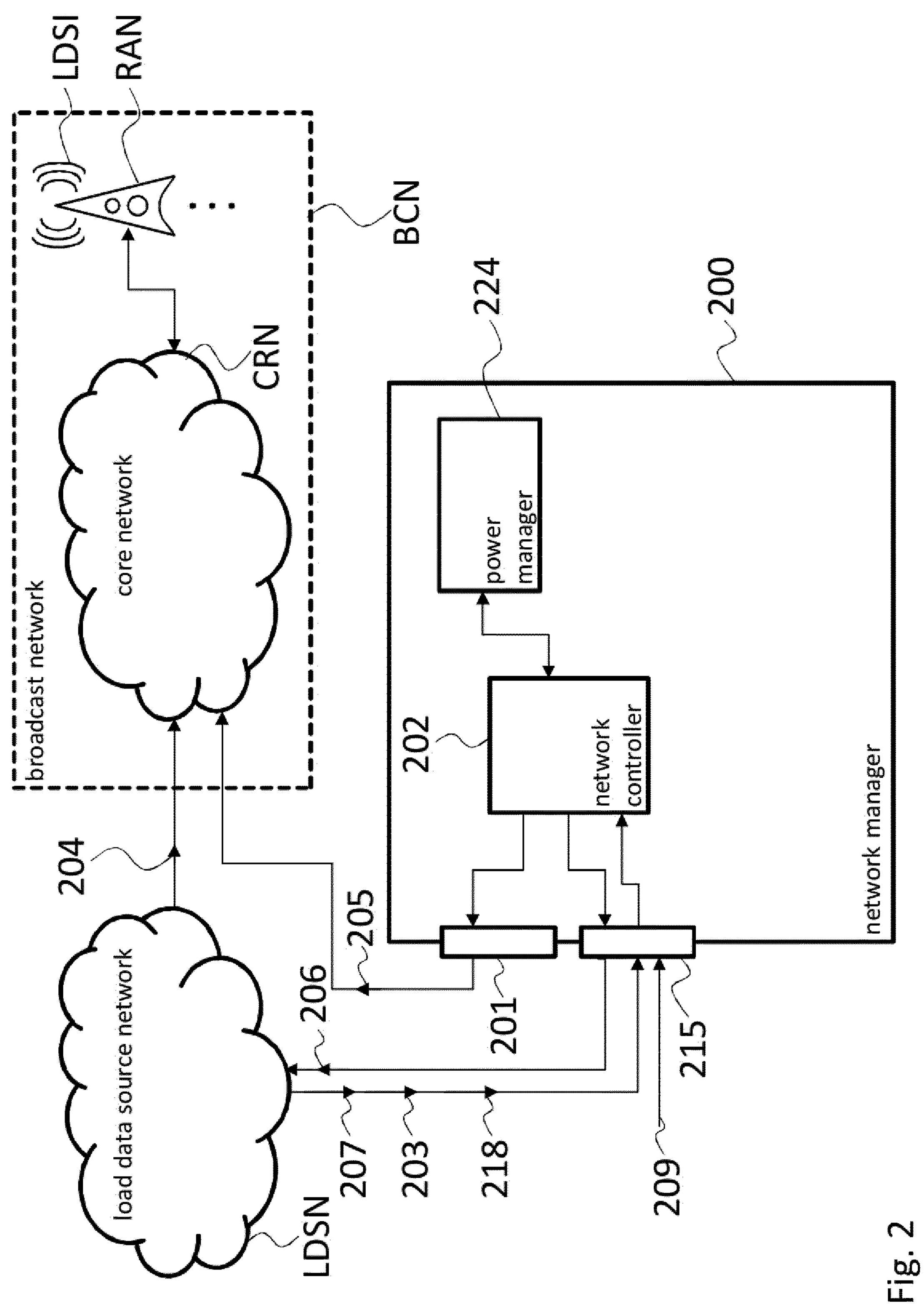
FIG. 2 shows a schematic diagram of another embodiment of a network manager according to the present disclosure, a load data source network and a broadcast network.

FIG. 2 shows another a network manager 200 with a load data source network LDSN and a broadcast network BCN. The above explanations regarding the load data source network LDSN and the broadcast network BCN apply mutatis mutandis.

The network manager 200 is based on the network manager 100, and therefore comprises a data interface 201 that is internally communicatively coupled to a network controller 202. Externally, the data interface 201 is communicatively coupled to the broadcast network BCN. The above-presented explanations regarding the network manager 100 and its elements also apply to the network manager 300 mutatis mutandis.

The network manager 200 further comprises a control interface 215 that is internally communicatively coupled to the network controller 202, and that is externally accessible via any data network, for example the internet. The control interface 215 is communicatively coupled to the load data source network LDSN. The control interface 215 further receives the receiving device data 209. Further, the control interface 215 may for example comprise a web-based user-accessible interface, an API-based machine-accessible interface, a RESTful interface, an XML-based or JSON-based interface, and a client-program-based interface. It is understood, that the control interface 215 may also be provided as element of the data interface 201. The control interface 215 may serve as easily accessible interface for exchanging data between the network manager 200, and the provider of the request data 203.

The network manager 200 further comprises a power manager 224. At least one of the radio access network resources may refer to a transmission power of the at least one radio access network RAN. The power manager 224 may now provide configuration data 205 to the at least one radio access network RAN e.g., via the network controller 202, indicating an adapted transmission power based on usage data for the radio access network resources. The usage data may for example comprise at least one of the receiving device data 209 and a usage schedule for the radio access network resources.

Figure 3:
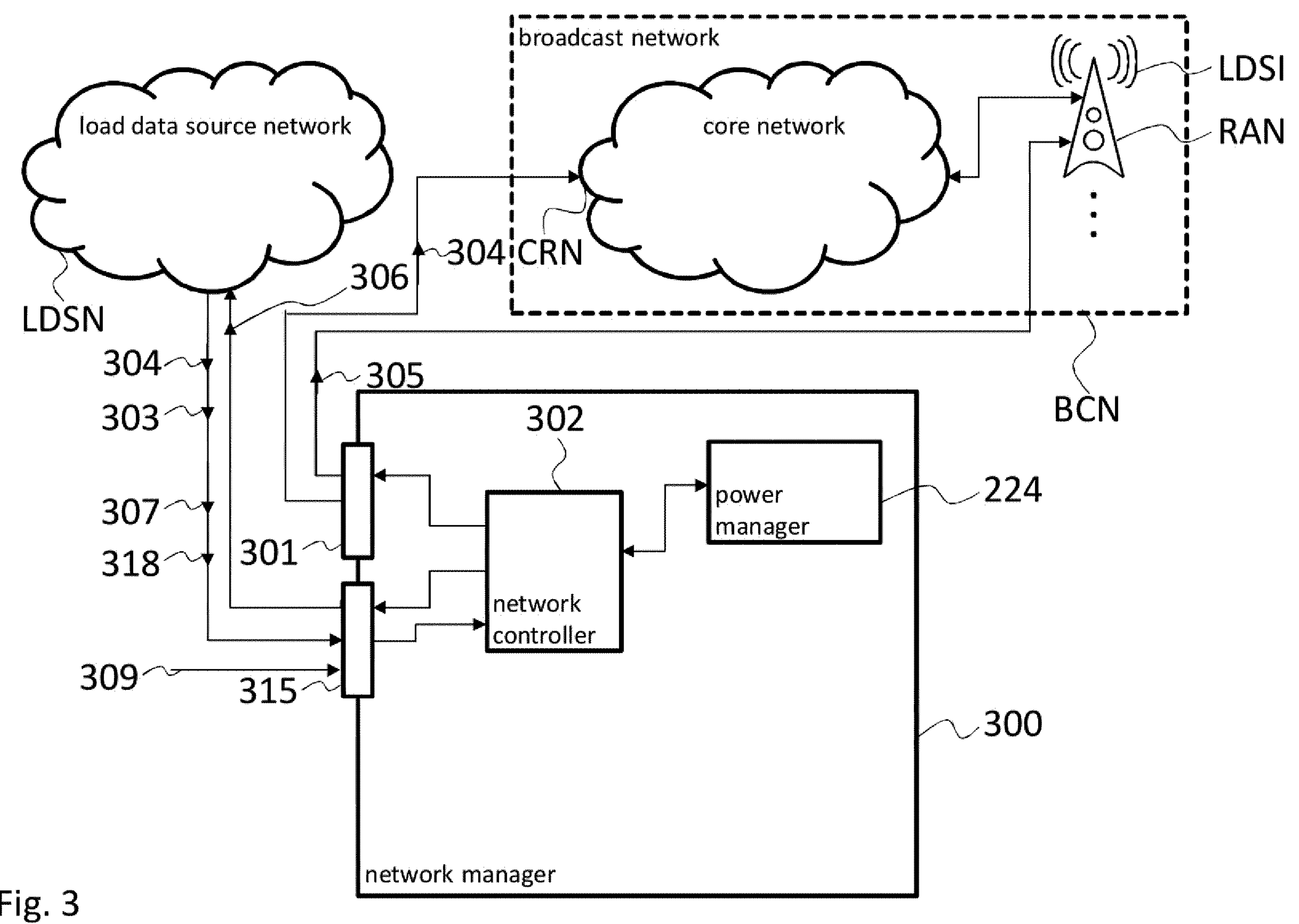
FIG. 3 shows a schematic diagram of another embodiment of a network manager according to the present disclosure, a load data source network and a broadcast network.

FIG. 3 shows another network manager 300. The network manager 300 is based on the network manager 200, and therefore comprises a data interface 301 that is internally communicatively coupled to a network controller 302. Externally, the data interface 301 is communicatively coupled to the broadcast network BCN.

The network manager 300 also comprises a control interface 315 that is internally communicatively coupled to the network controller 302. Externally, the control interface 315 is communicatively coupled to the load data source network LDSN.

The above-presented explanations regarding network manager 200 and its elements apply mutatis mutandis to network manager 300 and its elements.

In contrast to the arrangement of FIG. 2, in FIG. 3 the network manager 300 receives the load data 304 and forwards the load data 304 to the core network CRN. It is understood, that the network manager 300 may also provide the load data 304 to the radio access networks RAN, instead.

For sake of clarity in the following description of the method-based FIG. 4 the reference signs used above in the description of apparatus based FIGS. 1-3 will be maintained.

Figure 4:
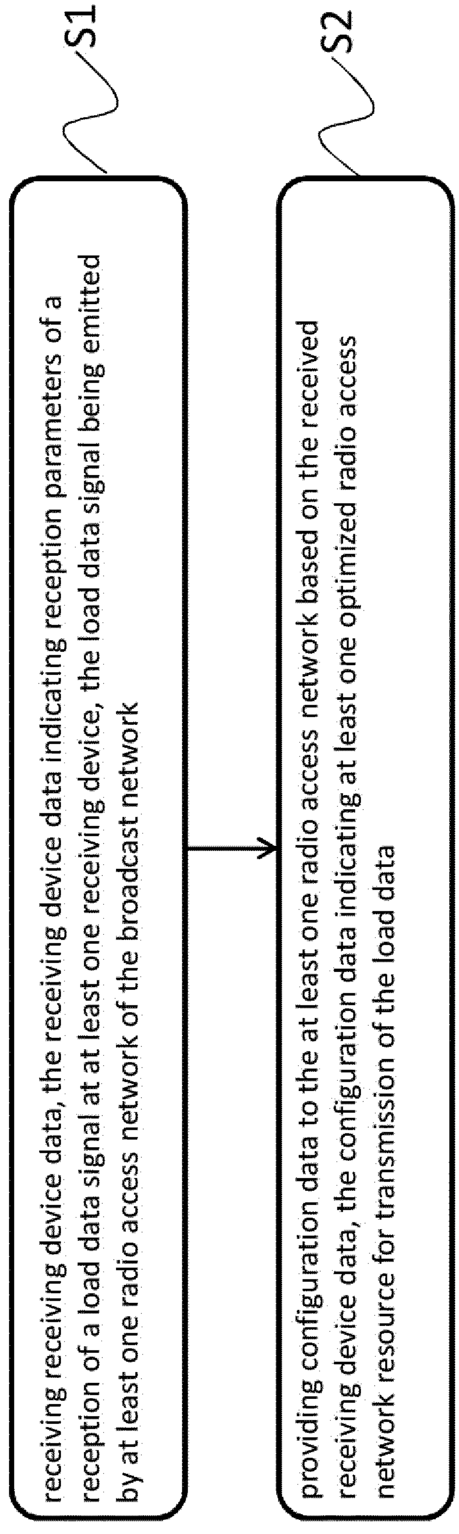
FIG. 4 shows a flow diagram of an embodiment of a method according to the present disclosure.

FIG. 4 shows a flow diagram of a method for managing a broadcast network BCN.

The method comprises receiving device data 109, 209, 309, the receiving device data 109, 209, 309 indicating reception parameters of a reception of a load data signal LDSI at at least one receiving device, the load data signal LDSI being emitted by at least one radio access network RAN of the broadcast network BCN. Providing configuration data 105, 205, 305 to the at least one radio access network RAN based on the received receiving device data 109, 209, 309, the configuration data 105, 205, 305 indicating at least one optimized radio access network resource for transmission of the load data 104, 204, 304.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

LIST OF REFERENCE SIGNS

100, 200, 300 network manager
101, 201, 301 data interface
102, 202, 302 network controller
104, 204, 304 load data
105, 205, 305 load data
109, 209, 309 receiving device data
215, 315 control interface
224, 324 power manager
RAN radio access network
LDSI load data signal BCN broadcast network
CRN core network
LDSN load data source network
S1, S2 method step

The invention claimed is:

1. A network manager comprising:

a data interface configured to communicatively couple to at least one radio access network (RAN) of a broadcast network (BCN) that is configured to wirelessly emit a load data signal (LDSI); and a network controller communicatively coupled to the data interface and configured to receive receiving device data, the receiving device data indicating reception parameters of the reception of the LDSI at at least one receiving device, and to provide configuration data to the at least one RAN based on the receiving device data, the configuration data indicating at least one optimized radio access network resource for transmission of load data, wherein the receiving device data comprises a ratio of fixed-position receiving devices and mobile receiving devices, and the network controller is configured to determine the configuration data based on the ratio of fixed-position receiving devices and mobile receiving devices, wherein the configuration data comprises radio access network resources that influence the reception of the load data signal when a device is fixed or mobile, wherein the radio access network resources comprises a cyclic prefix of the load data signal.

2. The network manager according to claim 1, wherein the receiving device data comprises at least one of:

a type indication for at least one receiving device,
a mobility information for at least one receiving device,
a position information for at least one receiving device,
a quality of service information for at least one receiving device,
a quality of experience information for at least one receiving device,
a viewing rate for at least one receiving device,
a reception information regarding the reception of predefined data transmitted via the at least one RAN to at least one receiving device,
a handover information provided to at least one receiving device regarding a handover of the at least one receiving device between two RANs,
a signal strength indication for at least two of the RANs as measured by at least one receiving device,
a frequency range or bandwidth for transmission of the load data, or
a modulation scheme for transmission of the load data.

3. The network manager according to claim 1, wherein the at least one radio access network resource comprises at least one of:

a geographical location for transmission of the load data,
a frequency range or bandwidth for transmission of the load data,
a transmission time or time slot for transmission of the load data,
a modulation scheme for transmission of the load data, or
an assignment of the load data to multicast channels.

4. The network manager according to claim 1, further comprising:

a power manager;

wherein the at least one radio access network resource refers to a transmission power of the at least one RAN; and wherein the power manager is configured to provide configuration data to the at least one RAN indicating an adapted transmission power, wherein the power manager is configured to adapt the transmission power based on usage data for the at least one radio access network resource, wherein the usage data comprises at least one of the receiving device data or a usage schedule for the at least one radio access network resource.

5. The network manager according to claim 1, wherein the data interface is configured to communicatively couple to a network operator network that is in wireless communication with the at least one receiving device or a content provider network that is in communication with the at least one receiving device, wherein the receiving device data is received from the network operator network or from the content provider network.

6. The network manager according to claim 1, wherein the network controller is configured to verify at least one of an authenticity or a validity of the receiving device data.

7. The network manager according to claim 1, wherein the network controller is configured to verify at least one of a plausibility or a consistency of the receiving device data.

8. The network manager according to claim 1, comprising a control interface communicatively coupled to the network controller that is accessible via a data network, wherein the control interface comprises at least one of a web-based user-accessible interface, an API-based machine-accessible interface, a RESTful interface, an XML-based or JSON-based interface, or a client-program-based interface.

9. A method for managing a broadcast network (BCN), the method comprising:

receiving device data, the receiving device data indicating reception parameters of a reception of a load data signal (LDSI) at at least one receiving device, the LDSI being emitted by at least one radio access network (RAN) of the BCN; and providing configuration data to the at least one RAN based on the receiving device data, the configuration data indicating at least one optimized radio access network resource for transmission of load data, wherein the receiving device data comprises a ratio of fixed-position receiving devices and mobile receiving devices, wherein the configuration data is determined based on the ratio of fixed-position receiving devices and mobile receiving devices, wherein the configuration data comprises radio access network resources that influence the reception of the load data signal when a device is fixed or mobile, wherein the radio access network resources comprises a cyclic prefix of the load data signal.

10. The method according to claim 9, wherein the receiving device data comprises at least one of:

a type indication for at least one receiving device,
a mobility information for at least one receiving device,
a position information for at least one receiving device,
a quality of service information for at least one receiving device,
a quality of experience information for at least one receiving device,
a viewing rate for at least one receiving device,
a reception information regarding the reception of predefined data transmitted via the at least one RAN to at least one receiving device,
a handover information provided to at least one receiving device regarding a handover of the at least one receiving device between two RANs, a signal strength indication for at least two of the RANs as measured by at least one receiving device, a frequency range or bandwidth for transmission of the load data, or a modulation scheme for transmission of the load data.

11. Method according to claim 9, wherein the at least one radio access network resource refers to a transmission power of the at least one RAN, and the method further comprising:

providing configuration data to the at least one RAN indicating an adapted transmission power that is adapted based on usage data for the at least one radio access network resource, wherein the usage data comprises at least one of the receiving device data or a usage schedule for the at least one radio access network resource.

12. The method according to claim 9, wherein the receiving device data is received from a network operator network or from a content provider network, wherein the network operator network is in wireless communication with the at least one receiving device or the content provider network is in communication with the at least one receiving device.

13. The method according to claim 9, the method further comprising: verifying at least one of an authenticity or a validity of the receiving device data.

14. The method according to claim 9, wherein the at least one radio access network resource comprises at least one of:

a geographical location for transmission of the load data, a frequency range or bandwidth for transmission of the load data, a transmission time or time slot for transmission of the load data, a modulation scheme for transmission of the load data, or an assignment of the load data to multicast channels.

15. The method according to claim 9, wherein the receiving device data is received via a control interface that is accessible via a data network, wherein the control interface comprises at least one of a web-based user-accessible interface, an API-based machine-accessible interface, a RESTful interface, an XML-based or JSON-based interface, or a client-program-based interface.

16. The method according to claim 9, further comprising:

verifying at least one of a plausibility or a consistency of the received receiving device data.

* * * * *